Sept. 11, 1923.
G. A. LYON
DOUBLED ATTACHING MEMBER BUFFER
Original Filed Feb. 12, 1920
1,467,383
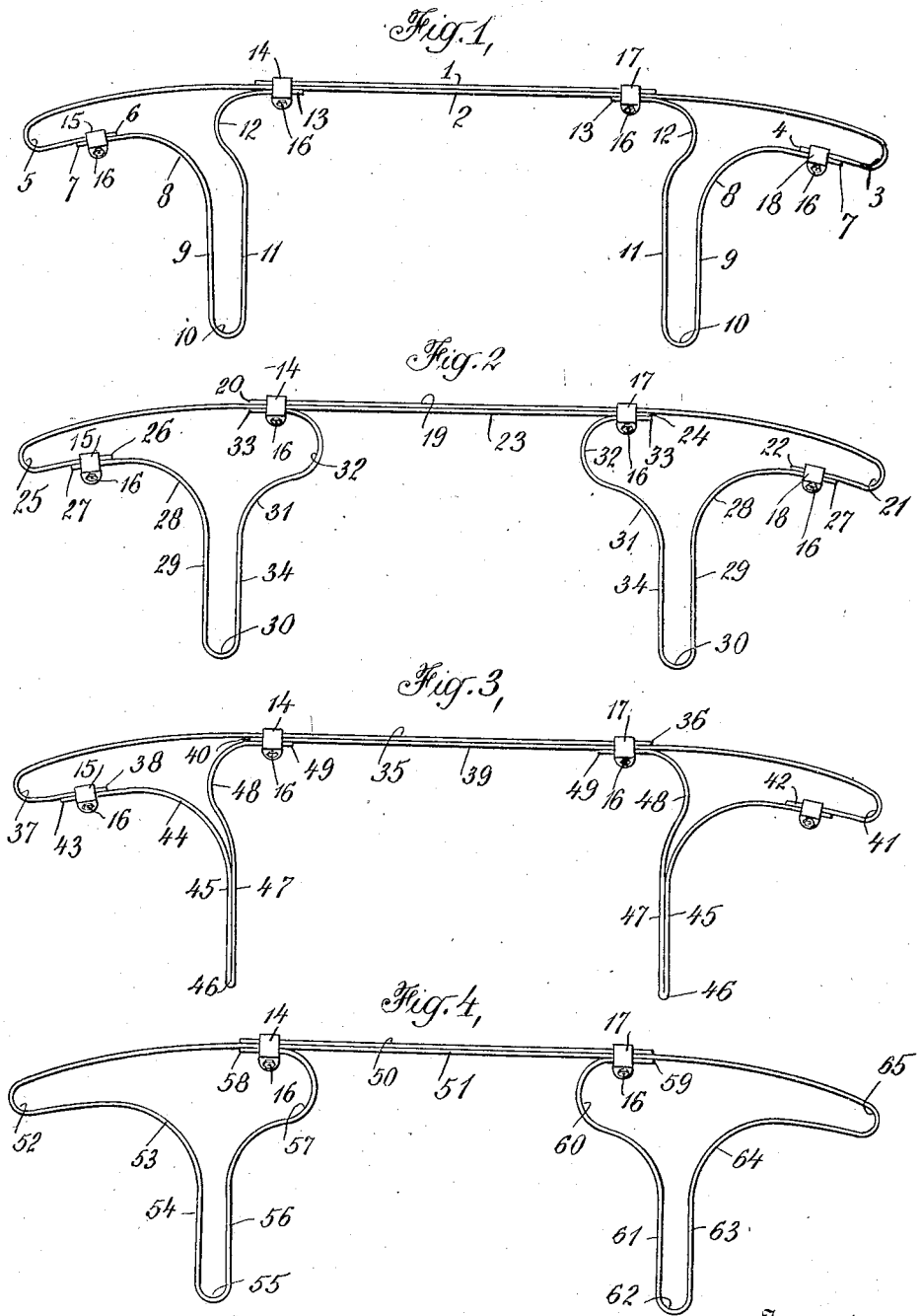

Patented Sept. 11, 1923.

1,467,383

UNITED STATES PATENT OFFICE.

GEORGE ALBERT LYON, OF PHILADELPHIA, PENNSYLVANIA.

DOUBLED ATTACHING-MEMBER BUFFER.

Application filed February 12, 1920, Serial No. 358,238. Renewed February 9, 1922. Serial No. 535,398.

*To all whom it may concern:*

Be it known that I, GEORGE ALBERT LYON, a citizen of the United States, and resident of Philadelphia, county of Philadelphia, and State of Pennsylvania, have made certain new and useful Inventions Relating to Doubled Attaching - Member Buffers, of which the following is a specification, taken in connection with the accompanying drawing.

This invention relates especially to resilient buffers or bumpers for automobiles or other vehicles which may comprise resilient strip members including impact receiving or front members and detachably connected doubled attaching members which may have outer and inner connecting portions clamped or connected to separated parts of the buffer front so as to give increased lateral stiffness thereto. The duplex attaching members may in some cases be spaced apart so as to form an attaching loop which gives a more yielding or resilient form or connection with the cooperating automobile frame member or if desired these duplex attaching members may have closely spaced spring strip elements which give greatly increased strength to this part of the buffer and more closely resembles the standard Lyon spring bumpers generally on the market.

In the accompanying drawing showing in a somewhat diagrammatic way various illustrative embodiments of this invention, Figs. 1 to 4 are plan views showing various illustrative forms of buffers.

The attaching members which may be formed of tempered spring steel strip or other resilient material may in some cases have spaced apart duplex attaching members 9, 11 yieldingly joined by the attaching loop 10 at the rear part of these attaching members where they may be clamped, bolted or otherwise connected to the automobile frame members. The outer strip 9 may have an outwardly curving portion 8 which gives increased resilient yielding action and the preferably substantially straight outer connector portion 7 may be arranged to cooperate with any buffer member of suitable shape and size. The inner attaching element or strip 11 may merge into the outwardly extending yielding connector loop 12 and the inner connecting portion 13 extending substantially transversely of the buffer so as to be clamped or connected to the cooperating buffer member. Two such substantially similar resilient attaching members may be used in each buffer and may be adjustably or otherwise clamped or connected to the cooperating buffer front preferably of substantially resilient or spring strip construction which may comprise one or more resilient strips preferably having end loops and inturned connector portions. In the construction shown in Fig. 1 the buffer front comprises a single spring strip 2 having integral end loops 3 and 5, the inturned connector portions 4, 6 being arranged at such angle as to cooperate with the outer connector portions 7 of the attaching members; while the inner connector portions 13 thereof may be similarly clamped or connected to the more central impact receiving portions of the buffer as by clamps 14, 17 which may also connect thereto one or more front reenforcing strips or members, such as 1. The other similar clamps 15, 18 enclosing or cooperating with the other outer connector portions may be similarly tightened by the bolts or nuts 16 so as to securely hold these cooperating portions in adjusted position after the attaching members have been so arranged that they are at the proper distance apart to fit the particular automobile or other vehicle.

Fig. 2 shows another form of construction in which the attaching members may have an outer connector portion 27 and cooperating curved yielding portion 28 connected with the outer strip or element 29 of the doubled attaching member which may have an attaching loop 30 and connected portion 34. In this case the connector loop 32 may extend inward from the curved portion 31 and support the inner connector portion 33 in such position as to cooperate with the buffer front. Two such duplex attaching members may be used in connection with the two-piece resilient strip buffer front which may as indicated comprise the front or impact receiving members 19, 23 which may be arranged in reenforcing superimposed position between the central clamping devices or clips 14, 17. The end loops 21, 25 may be formed integrally one on each of these front members which may have the connector portions 22, 26 of such angularly disposed or curved form as to cooperate with the outer connector portions with the attaching members and be clamped thereto by the clips 15, 18. The length of the front members may be such that the ends 20, 24 of their overlapping reenforcing portions may come substantially in line with the ends of the inner connector portions 33 when used on standard size automobiles. This form of buffer makes it possible to adjust the width of the buffer front so that the end loops 21, 25 may extend out into proper protective position in front of the automobile wheels which is a considerable advantage in many cases. Furthermore, a two-piece buffer front of this character makes a considerably smaller package for shipment which is naturally advantageous.

Fig. 3 shows another form of construction in which a generally similar two-part buffer front is used comprising impact receiving members 35, 39 each having an end loop, such as 37, 41 and inturned connector portions 38, 42. In this instance the duplex attaching members may have their rearwardly extending portions 45, 47 closely spaced or in substantial contact as indicated, so that a relatively narrow attaching end 46 may be formed thereon giving considerably increased strength to this attaching member without any undesirable lateral extension thereof. The attaching member may have the outwardly curving portion 44 and outer connector portion 43 while the other end of the strip may extend outward to any suitable extent in order to secure the desired amount of resilient yield for the inner connector portion 49. The outwardly turned connector loop 48 illustrated gives a relatively stiff construction at this point and of course a greater extension outward toward the outer connector portion 43 gives a correspondingly greater yield to the inner connector portion under collision conditions. These connector portions may be adjustably clamped to the buffer front as by the enclosing clamping devices or clips such as 14, 15 and 17 which for similar reasons render the width of the buffer front adjustable and make possible a desirably small package. It is of course understood also that the lateral separation of the two connector portions of each attaching member contributes to the vertical lateral stiffness of the buffer front members connected thereto which is naturally desirable since it minimizes movement or vibration under running conditions of the vehicle.

In the Fig. 4 construction the two duplex attaching members are illustrated as formed of a single piece of resilient strip material which may also have end loop portions. In this instance the end loop 52 at one side of the buffer may have the connected curved yielding portion 53 connecting the strip to the spaced apart duplex connector portions 54, 55, 56 while an inwardly curved connector loop 57 may have the connector portion or end 58 to be clamped to the buffer front 51. On the other side of the buffer the connector portion 59 continues as the connector loop 60 and rearwardly extending connector portion 61, 62, 63, this outer connector portion communicating with the outwardly curved portion 64 and end loop 65 merging into the relatively straight buffer front. If desired one or more front re-enforcing members or strips, such as 50, may be used and connected to the buffer front by the connecting devices or enclosing clips 14, 17 which may hold all of the parts in vertically rigid position.

This invention has been described in connection with a number of illustrative forms, proportions, parts, arrangements, materials, methods of connection and use, to the details of which disclosure the invention is not of course to be limited, since what is claimed as new and what is desired to be secured by Letters Patent is set forth in the appended claims.

I claim—

1. The automobile buffer comprising a pair of attaching members having closely spaced rearwardly extending attaching portions and a connecting attacher loop, an outer connector portion and an inner connector portion to cooperate with the buffer front at a point considerably inside said outer connector portion and a buffer front comprising substantially straight impact receiving members adapted to be clamped in mutually re-enforcing overlapping position and end loops and inwardly extending connector portions adapted to be adjustably clamped to the outer connector portion of one of said attaching members.

2. The autmobile buffer comprising a pair of attaching members having closely spaced rearwardly extending attaching portions and a connecting attacher bend, an outer connector portion and an inner connector portion to cooperate with the buffer front at a point considerably inside said outer connector portion and a buffer front comprising an impact receiving member and end loops and inwardly extending connector portions cooperating with the outer connector portions of one of said attaching members.

3. The automobile buffer comprising a pair of substantially similar duplex attaching members each having closely spaced rearwardly extending attaching portions, an outer connector portion and an outwardly extending resiliently yielding connector loop provided with an inner connector portion to cooperate with the buffer front at a point considerably inside said outer connector portion, and a pair of resilient strip buffer front members comprising substantially straight impact receiving members adapted to be clamped in mutually reenforcing overlapping position and each of said buffer front members comprising an end loop and an inwardly extending connector portion adapted to be adjustably clamped to the outer connector portion of one of said attaching members and enclosing clamping devices to adjustably clamp together said connector portions in vertically rigid alignment.

4. The automobile buffer comprising a pair of duplex attaching members each having closely spaced rearwardly extending attaching portions, an outer connector portion and an outwardly extending resiliently yielding connector loop provided with an inner connector portion to cooperate with the buffer front at a point considerably inside said outer connector portion, and a pair of resilient strip buffer front members comprising impact receiving members adapted to be clamped in mutually reenforcing overlapping position and each of said buffer front members comprising an end loop and an inwardly extending connector portion adapted to be adjustably clamped to the outer connector portion of one of said attaching members.

5. The automobile buffer comprising a pair of duplex attaching members each having closely spaced rearwardly extending attaching portions, an outer connector portion and an inner connector portion to cooperate with the buffer front at a point considerably inside said outer connector portion, and a pair of resilient strip buffer front members comprising impact receiving members adapted to be clamped in mutually reenforcing overlapping position and each of said buffer front members comprising an inwardly extending connector portion adapted to be adjustably clamped to the outer connector portion of one of said attaching members.

6. The automobile buffer comprising a pair of substantially similar duplex attaching members having spaced apart rearwardly extending attaching portions and a connecting attacher loop, an outer connector portion, an outwardly extending resiliently yielding connector loop and a connected inwardly extending inner connector portion to cooperate with the buffer front at a point considerably inside said outer connector portion and a pair of resilient strip buffer front members comprising substantially straight impact receiving members adapted to be adjustably clamped in mutually reenforcing overlapping position and each of said buffer front members comprising an end loop and an inwardly extending connector portion adapted to be adjustably clamped to the outer connector portion of one of said attaching members and enclosing clamping devices to adjustably clamp together said connector portions in vertically rigid alignment.

7. The automobile buffer comprising a pair of substantially similar duplex attaching members having spaced apart rearwardly extending attaching portions and a connecting attacher loop, an outer connector portion, an outwardly extending resiliently yielding connector loop and a connected inwardly extending inner connector portion to cooperate with the buffer front at a point considerably inside said outer connector portion and a pair of resilient strip buffer front members comprising impact receiving members adapted to be clamped in mutually reenforcing overlapping position and each of said buffer front members comprising an inwardly extending connector portion adapted to be adjustably clamped to the outer connector portion of one of said attaching members and clamping devices to adjustably clamp together said connector portions in vertically rigid alignment.

8. The automobile buffer comprising a pair of substantially similar duplex attaching members having spaced apart rearwardly extending attaching portions, an outer connector portion and a resiliently yielding connector loop having a connected inner connector portion to cooperate with the buffer front at a point considerably inside said outer connector portion and a resilient strip buffer front member comprising multiple thickness substantially straight central impact receiving members and comprising end loops and inwardly extending connector portions adapted to be clamped to the outer connector portion of one of said attaching members.

9. The autmobile buffer comprising a pair of substantially similar duplex attaching members having rearwardly extending attaching portions, an outer connector portion and a resiliently yielding connector loop having a connected inner connector portion to cooperate with the buffer front at a point considerably inside said outer connector portion and a resilient strip buffer front member comprising central impact receiving members and comprising inwardly extending connector portions adapted to be clamped to the outer connector portions of one of said attaching members.

10. The automobile buffer comprising a pair of substantially similar duplex spring strip attaching members having closely spaced rearwardly extending attaching portions, an outer connector portion and an inwardly extending connector portion to cooperate with the buffer front, and a spring strip buffer front comprising an impact receiving member adapted to be clamped to said inwardly extending connector portions and comprising end loops and integrally connected inwardly extending connector portions adapted to be adjustably clamped to the outer connector portions of said attaching members and enclosing clamping devices to adjustably clamp together said connector portions in vertically rigid alignment.

11. The automobile buffer comprising a pair of substantially similar duplex attaching members having closely spaced rearwardly extending attaching portions, an outer connector portion and an inwardly extending connector portion to cooperate with the buffer front, and a spring strip buffer front comprising an impact receiving member adapted to be clamped to said inwardly extending connector portions and comprising end loops and integrally connected inwardly extending connector portions adapted to be clamped to the outer connector portions of said attaching members and clamping devices to clamp together said connector portions in vertically rigid alignment.

12. The buffer comprising a pair of substantially similar duplex resilient strip attaching members having closely spaced rearwardly extending attaching portions, a forwardly and outwardly bent outer connector portion and a forwardly and inwardly bent inner connector portion to cooperate with the buffer front at laterally separated points, and a resilient strip buffer front comprising an impact receiving member having central connector portions adapted to be clamped to said inner connector portions of said attaching members and comprising inturned end connector portions adapted to be adjustably clamped to the outer connector portions of said attaching members and clamping devices to adjustably clamp together said connector portions in vertically rigid alignment.

13. The buffer comprising a pair of duplex resilient strip attaching members having closely spaced rearwardly extending attaching portions, a forwardly and outwardly bent outer connector portion and a forwardly and inwardly bent inner connector portion to cooperate with the buffer front at laterally separated points, and a resilient strip buffer front comprising an impact receiving member having inner connector portions adapted to cooperate with said inner connector portions of said attaching members and comprising inturned end connector portions adapted to cooperate with the outer connector portions of said attaching members and clamping devices to adjustably clamp together said connector portions.

14. The buffer comprising a pair of resilient strip attaching members having closely spaced rearwardly extending attaching portions, a forwardly and outwardly bent outer connector portion and a forwardly and inwardly bent inner connector portion to cooperate with the buffer front at laterally separated points, and a resilient strip buffer front comprising an impact receiving member having inner connector portions adapted to cooperate with said inner connector portions of said attaching members and comprising inturned end connector portions adapted to cooperate with the outer connector portions of said attaching member and means rigidly securing together such connector portions.

15. The automobile buffer comprising two resilient strip attaching members having closely spaced rearwardly extending attaching portions, an outer connector portion and a transversely separated inwardly extending connector portion to cooperate with the buffer front, and a resilient strip buffer front comprising an impact receiving member adapted to be clamped to said inwardly extending connector portions and comprising end loops and inwardly extending connector portions adapted to be adjustably clamped to the outer connector portions of said attaching members.

16. The automobile buffer comprising two strip attaching members having rearwardly extending attaching portions, an outer connector portion and a transversely separated inwardly extending connector portion to cooperate with the buffer front, and a strip buffer front comprising an impact receiving member adapted to be clamped to said inwardly extending connector portions and comprising inturned end connector portions adapted to be clamped to the outer connector portions of said attaching members.

17. The automobile buffer comprising a pair of substantially similar duplex attaching members having spaced apart rearwardly extending attaching portions, an outer connector portion and a resiliently yielding connector loop having a connected inner connector portion to be adjustably connected with the buffer front at a point considerably inside said outer connector portion and a resilient strip buffer front member comprising substantially straight central impact receiving members and comprising end loops and inwardly extending connector portions each adapted to be adjustably clamped to the outer connector portion of one of said attaching members.

18. The automobile buffer comprising a resilient strip buffer front having substantially straight central impact receiving portions and end loops and inwardly extending rear connector portions, and a pair of substantially similar duplex attaching members each having spaced apart rearwardly extending attaching portions adapted to be connected to the automobile and having an outwardly extending resilient connector portion clamped to an inturned connector portion of the buffer front and having an inwardly extending inner connector portion clamped to the buffer front at a point considerably inside said outer connector portion of said attaching member to hold said buffer front at longitudinally separated points.

19. The automobile buffer comprising a resilient strip buffer front having central impact receiving portions and end loops and inwardly extending rear connector portions, and a pair of resilient strip attaching members having spaced apart attaching portions adapted to be connected to the automobile and having an outwardly extending resilient connector portion adapted to be connected to an inturned connector portion of the buffer front and having an inwardly extending inner connector portion adapted to be connected to the buffer front at a point adjacent its central portion and considerably inside said outer connector portion of said attaching member to hold said buffer front at longitudinally separated points.

GEORGE ALBERT LYON.